Aug. 2, 1927.
D. L. WILLIAMS
1,637,794
KNIFE BRACKET FOR TIRE MACHINES
Filed May 23, 1925
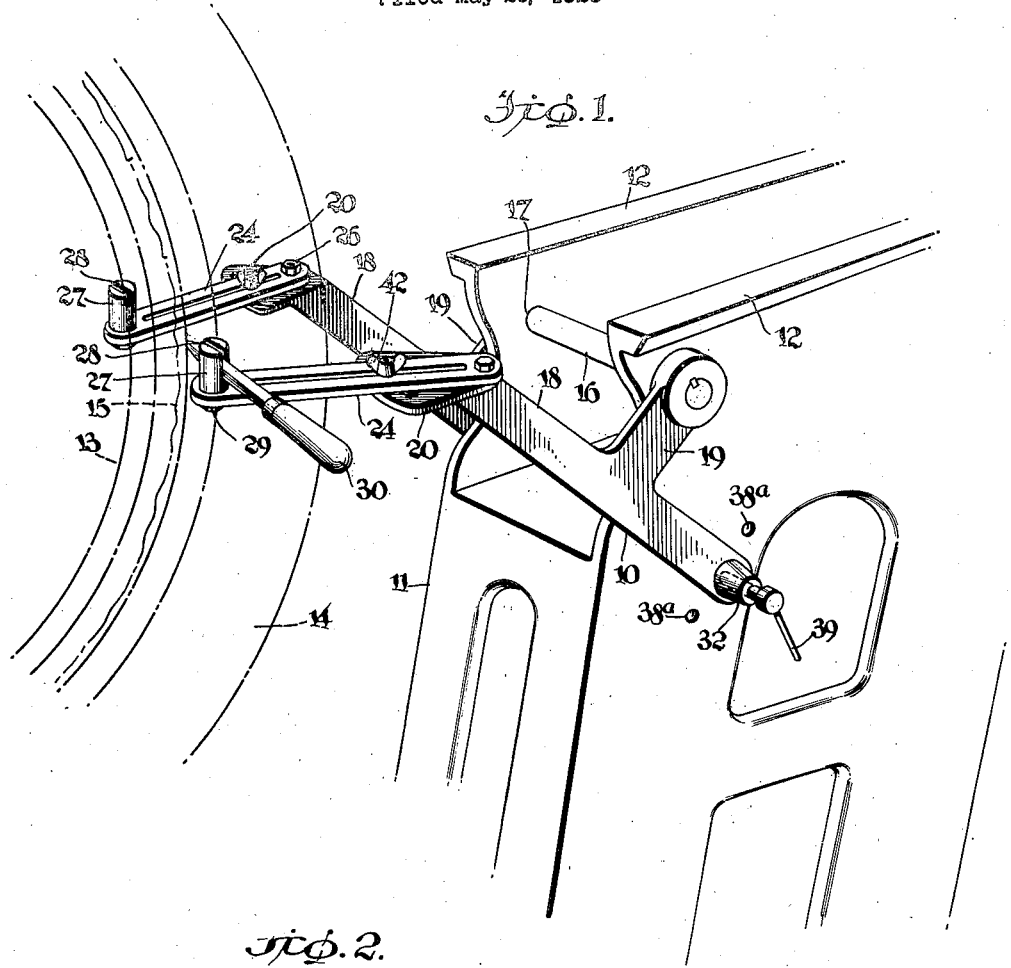
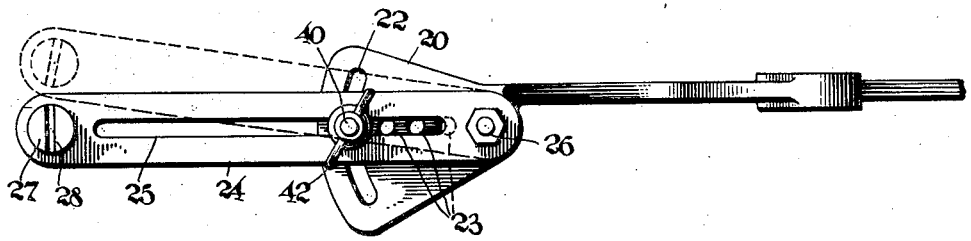
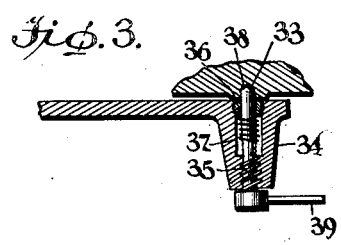
INVENTOR
*Dayton L. Williams,*
BY
*R. P. Trogner*
ATTORNEY Patented Aug. 2, 1927.

1,637,794

UNITED STATES PATENT OFFICE.

DAYTON L. WILLIAMS, OF AKRON, OHIO, ASSIGNOR TO THE GOODYEAR TIRE & RUBBER COMPANY, OF AKRON, OHIO, A CORPORATION OF OHIO.

KNIFE BRACKET FOR TIRE MACHINES.

Application filed May 23, 1925. Serial No. 32,407.

My invention relates to appliances employed in conjunction with tire building machines and it has particular relation to a device adapted to aid in severing waste material from a tire carcass during the tire-building process.

One object of my invention is to provide an attachment for a tire-building machine which will increase the efficiency of the operator in trimming waste material from a tire casing and which further serves as a safety device to prevent injury to the workman while trimming the casing.

Another object of my invention is to provide a tire-trimming device for a tire-building machine which is inexpensive, simple in operation, and so constructed that it may be brought into position for operation and removed from such position without interfering with the tire-building operations.

While tire casings are being built, the operation of which includes applying several strips of rubberized fabric to a rotary collapsible core in the well known manner, there are always certain irregularities in the edges of the rubberized fabric plies or flipper strips about the bead portions of the tire carcass. My invention is particularly directed to facilitating the trimming operation by providing a bracket which may be easily attached to the tire building machine and which may be swung into position adjacent the tire carcass to assume various adjusted positions in order to accommodate tires of the several dimensions commonly manufactured. This bracket is provided with a member adapted to receive a knife blade adjacent the uneven edges of the carcass to be trimmed. The knife is firmly pressed by the operator and guided by the bracket in such manner as to uniformly trim uneven edges of the plies of the carcass without incurring any danger of accident to the operator.

For a more thorough understanding of my invention, reference may now be had to the accompanying drawings forming a part of this specification, of which:

Fig. 1 is a perspective view of a device embodying the principles of my invention and illustrating the manner in which it is associated with a tire building machine and a tire carcass.

Fig. 2 is a plan view of one of the major elements of the device; and

Fig. 3 is a fragmentary view in detail, illustrating a securing and releasing apparatus for positioning the device in operative relationship to the tire.

In practising my invention, I have constructed an attachment or device generally embodying the principles thereof, indicated by the numeral 10. This attachment is secured to the conventional stitcher-head 11 of a tire-building machine which is provided with two guide or track members 12 upon which the apparatus is mounted. The tire-building machine is provided with a conventional form of collapsible annular core 13 upon which the plies of a tire carcass 14 are built. After a number of the plies have been stitched upon each other over the core, uneven superfluous edges, as indicated diagrammatically at 15, remain and must be trimmed away.

In mounting the attachment upon the stitcher head, I have provided a shaft 16 journalled in openings 17 provided in the guide members of the stitcher head. The attachment is constructed of two symmetrical arms 18, each provided with an integral projection 19 which is keyed to the shaft 16. From this construction it will be observed that the shaft 16 provides a means for rigidly inter-connecting the arms 18. At one end of each of the arms, a flared integral plate 20 is formed which is triangular in contour and is provided with an arcuate slot 22 at one extremity extending in one direction and a series of bolt holes 23 extending in the opposite direction. A bar 24, formed with an elongate opening 25, is connected at one end to the flared plate by means of a bolt 26 disposed in one of the holes 23. The other end of the bar is provided with a cylindrical upright member 27 formed with a slot 28 therein and is rotatably secured by means of a nut 29 to the bar. The slot in the upright member is adapted to receive the blade of a trimming knife 30 and forms a guide through which the trimming knife operates against the part of the carcass to be trimmed.

At the end of each of the arms 18 adjacent the stitcher-head I have provided a securing or locking device 32, as illustrated in Fig. 3, which is composed of a screw-threaded pin 33 rotatably carried in a hollow boss 34 having screw threads therein co-operating with the threads of the pin, as indicated at 35. The threads of the elements are of relatively steep pitch and when rotated, move either inwardly or outwardly according to the direction of rotation. The pin is guided in the opening of the boss by means of a nut 36 screwed into the opening and through which the pin slidably extends. A spring 37, under tension, is secured to the pin and to the nut and tends to maintain the pin pressed toward the stitcher head at all times. An opening 38 is formed in the stitcher-head on each side thereof and is adapted to register with the pin when the arms are moved to the position shown in Fig. 1. In this position the pin snaps into the opening and the arms are rigidly held in the operative relationship shown in this figure. The end of the pin is provided with a handle 39 rigidly secured thereto. When the handle 39 is turned and is carried outwardly by the threads 35, which action draws the end of the pin from the opening 38, this movement tends to unwind the spring 37 from the pin and at the same time the end of the spring which is secured to the pin is drawn toward the bottom of the cavity in the boss 34. Since the other end of the spring is secured to the nut 36, it is obvious that by turning the handle 39 to rotate the pin 33, the spring 38 will be elongated and at the same time a torsional force will be imparted thereto. Therefore, when the handle is released the spring will tend to return to its normal position, thereby causing the pin to rotate within the threaded portion 35. From this description it will be apparent that the pin 33 will snap into the openings 38 or 38ᵃ when the arms 10 are so moved about their pivotal connection that the pin and openings register with each other.

It will be seen from Fig. 1 that the ends of the arms carrying the slotted bar are the heavier and as soon as the pin is released, the arms fall away from the tire carcass to the sides of the stitcher-head and are thus free from interference with the remaining operation of building the tire. It is evident that a series of holes 38ᵃ corresponding to the one indicated at 38, may be provided in the stitcher-head in case it is found to be desirable to vary the relative height of the bars 24.

By reference to Fig. 2 it will be seen that each of the bars 24 may be adjusted in two directions. The bolt 26 may be adjusted in any one of the holes 23 in order to provide a longer or shorter arm as desired. Also a bolt 40 provided with a wing nut 42 is positioned in the slots 22 and 25 where they intersect and register, permitting the position of the bar to be varied and clamped into adjusted position in a horizontal direction.

In the operation of the device, the arms 18 are manually swung upon the shaft 16 carried by the stitcher-head until the pin 33 snaps into the opening 38. The operator then holds a knife blade within the slot 28 and presses it against the core of the tire-building machine and as the core rotates in the usual manner, the edges are trimmed as desired. As soon as the edges of the carcass are sufficiently trimmed, the pin 33 is released by turning the handle 39 and the attachment drops away from the tire carcass adjacent the sides of the stitcher head.

Although I have illustrated but one form which my invention may assume and have described in detail but a single application thereof, it will be apparent to those skilled in the art that it is not so limited, but that various minor modifications and changes may be made therein without departing from the spirit of my invention or from the scope of the appended claims.

What I claim is:

1. A tire trimming mechanism including a bracket adapted to be pivoted to a stationary support comprising means for supporting a knife on the bracket, a pin mounted on the bracket and spaced from the pivotal point thereof adapted to engage the stationary support to hold the bracket in a predetermined position, and a yieldable member connected to and tending to actuate the pin toward the support.

2. A tire trimming mechanism including a bracket adapted to be pivoted to a stationary support provided with an opening therein comprising means for supporting a knife on the bracket, a pin carried by the bracket and a spring engaging the pin adapted to cause the latter to snap into the opening in the stationary support to hold the bracket at a predetermined position.

3. A tire trimming mechanism including a bracket adapted to be pivoted to a stationary support comprising, a pair of interconnected arms each having a slotted flared end, a slotted bar secured to each flared end, an adjusting bolt extending through the slot in the bar and through the slot in the flared end adapted to secure the flared end and bar in various positions, and a member secured to the end of each bar for guiding a knife.

4. The combination with a tire-building machine provided with a tire forming core and a stitcher head, of a bracket comprising a pair of arms pivoted to the stitcher head, a member rigidly connecting the arms, being journaled upon the stitcher head, an elongate knife supporting member longitudinally and laterally adjustable upon the outer end of each arm and a mechanism for holding the arms in operative position at opposite sides of the core, said mechanism including means operatively associated with the stitcher head and with the bracket adapted to release the latter to permit the arms to drop by gravity to the sides of the stitcher head.

5. The combination with a tire-building machine provided with a tire forming core and a stitcher head, of a bracket comprising an arm pivoted to swing in a substantially vertical plane upon the stitcher head, a guide member secured adjacent the outer end of the arm adapted to guide a knife against the forming core, and a mechanism carried by the arm engageable with the stitcher head for holding one end of the arm adjacent the forming core, said mechanism including means operatively associated with the stitcher head and with the bracket adapted to release the latter to permit the arm to swing by gravity to the side of the stitcher head.

In witness whereof, I have hereunto signed my name.

DAYTON L. WILLIAMS.